July 17, 1956  R. C. FERGASON  2,754,651
COTTON HARVESTER WITH WARNING SIGNAL
Filed June 18, 1953  3 Sheets-Sheet 1

Inventor
Rector C. Fergason
By
Attorney

July 17, 1956    R. C. FERGASON    2,754,651
COTTON HARVESTER WITH WARNING SIGNAL
Filed June 18, 1953    3 Sheets-Sheet 2

Inventor
Rector C. Fergason
by W. Jewels
Attorney

July 17, 1956 R. C. FERGASON 2,754,651
COTTON HARVESTER WITH WARNING SIGNAL
Filed June 18, 1953 3 Sheets-Sheet 3

Inventor
Rector C. Fergason

United States Patent Office 2,754,651
Patented July 17, 1956

2,754,651

COTTON HARVESTER WITH WARNING SIGNAL

Rector C. Fergason, Gadsden, Ala., assignor to Allis-Chalmers Manufacturing Company, Milwaukee, Wis.

Application June 18, 1953, Serial No. 362,455

6 Claims. (Cl. 56—41)

The invention relates to cotton harvesters, and it is concerned more particularly with an alarm system which will produce a warning signal when an excessive accumulation of harvested cotton occurs in a part of the machine where the cotton might become unduly compacted and, as a result, disable the machine or cause damage to moving parts thereof.

In cotton harvesters of the type wherein harvested cotton is removed from rotary picking spindles by means of a series of stationary, vertically spaced stripper bars, and a rotary series of stripper cleaning disks which assist in the removal and handling of the stripped cotton, abnormal conditions which cannot always be avoided, occasionally result in failure of the cleaning disks to function properly. In that event continued operation of the machine may cause an excessive amount of cotton to accumulate at the spindle entrance side of the stripper bars. For instance, a seed kernel or other obstruction may become lodged between the stripper bars and initiate an undue accumulation of cotton at the spindle entrance side of the stripper. Unless the machine is stopped reasonably soon after the cotton has started to pile up at the stripper and the obstruction is removed, the continued compacting of cotton, especially if it is wet due to the application of moistening fluid to the picking spindles, will ultimately result in bending and breaking of the picking spindles. The stripper bars and cleaning disks are necessarily enclosed, and an operator, therefore, cannot readily observe them to detect an abnormal or excessive accumulation of cotton at the stripper.

Attempts have heretofore been made to prevent damage which may result under the hereinabove outlined conditions, and in that connection a commonly used expedient has been the use of a pressure responsive switch which automatically shuts off the ignition current of the propelling engine and thereby causes the machine to stop in time to prevent damage. A sudden stoppage of the machine such as results from interruption of the ignition current, however, has certain drawbacks, considering that picking at a normal speed requires operation of the engine at close to full capacity, and the jerk or shock which results when the whole machine stops dead in its tracks may endanger a person or persons riding on the machine. For these and other reasons automatic stop mechanisms such as have heretofore been employed in connection with cotton harvesters have been found not to be entirely satisfactory.

Generally, it is an object of the invention to provide an improved cotton picking machine of the rotary spindle type which will automatically sound a warning signal in response to a dangerous accumulation of cotton at the spindle entrance side of the stripping mechanism. The sounding of a warning signal as contemplated by the invention has two major practical advantages over the heretofore used automatic stop systems namely, first, in that the operator, when he hears the signal, will know at once that cotton is clogging up at the stripping mechanism, and second, in that he can bring the machine to a stop gently and thereby avoid the mentioned objectionable jerk or shock. When a cotton harvester is stopped automatically by a conventional electrical system the operator cannot tell at once, when the machine stops, whether accumulation of cotton at the stripping mechanism or any one of a great many other possible sources of trouble has caused the stop, and he must investigate. In machines as contemplated by the invention, on the other hand, the warning signal immediately directs the operator's attention to the clogged condition at the stripping mechanism.

More specifically, it is an object of the invention to provide an improved cotton harvester incorporating an alarm system for producing a warning signal under conditions such as have been outlined hereinbefore, and which system will respond promptly and reliably to only a relatively slight departure from normal pressure conditions in a material confining space.

Another object of the invention is to provide an improved cotton harvester of the hereinabove outlined character incorporating a ratchet type audible alarm.

A still further object of the invention is to provide an improved cotton harvester of the hereinabove outlined character incorporating an audible alarm system which is simple in construction, efficient and reliable in operation, and which can readily be incorporated in a cotton picker of conventional construction.

The foregoing and other objects and advantages are attained by the present invention, various novel features of which will be apparent from the description herein and the accompanying drawings disclosing several embodiments of the invention, and will be more particularly pointed out in the appended claims.

Referring to the drawings.

Figure 1:
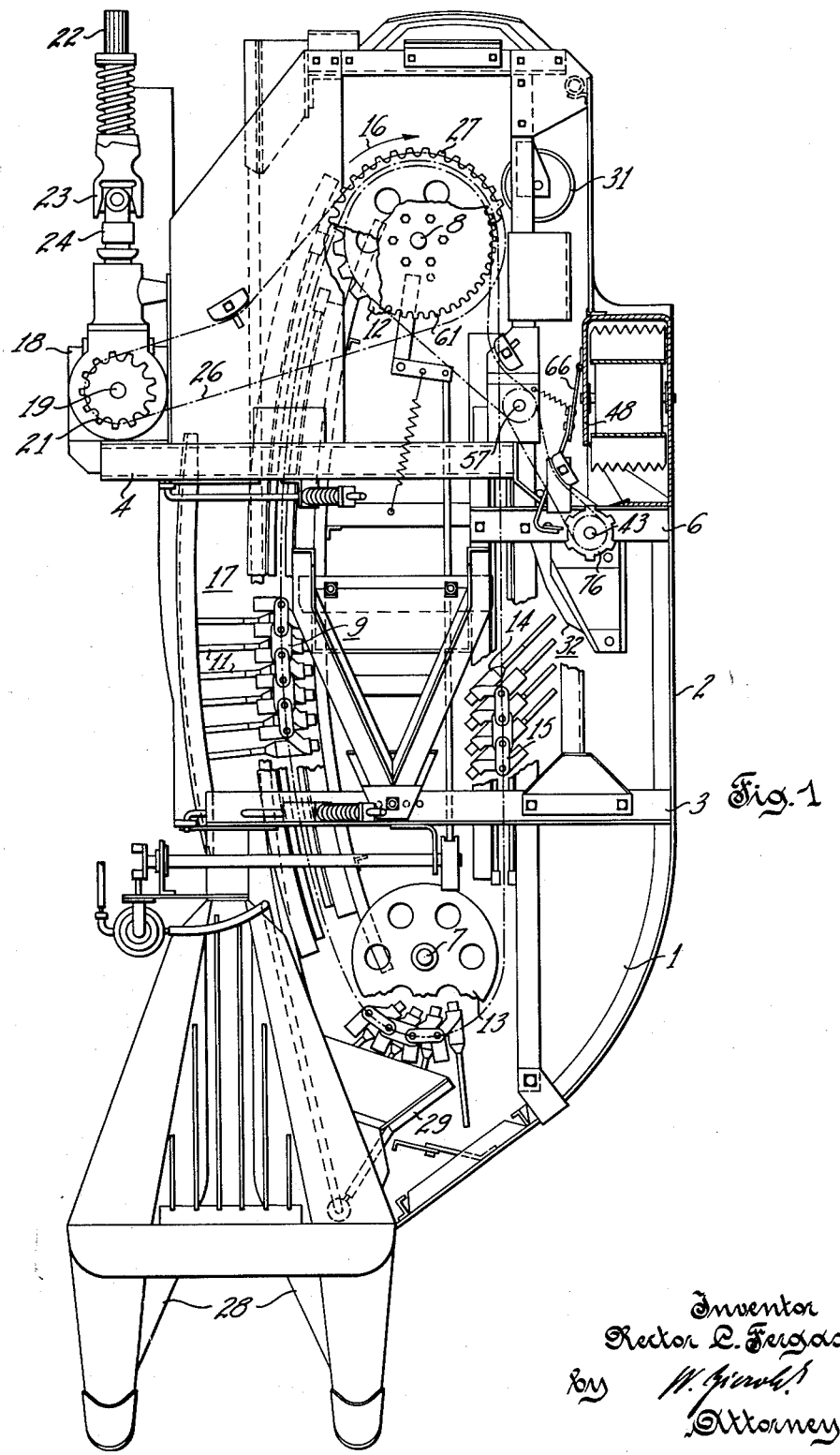
Fig. 1 is a top view of a rotary spindle type cotton picking mechanism, parts being broken away for purposes of exposure.

The picking mechanism shown in Fig. 1 represents a unitary structure which, in operation, is advanced along a row of cotton plants by a suitably constructed, self-propelled supporting vehicle, not shown, and on which vehicle the unit is mounted for up and down adjustment relative to the ground. A rigid main frame assembly which serves as a mounting base for various parts of the unit comprises a number of interconnected component elements including a bottom plate 1, an upright outer side wall 2, and cross frame members 3, 4 and 6.

Rotatably mounted on the main frame structure of the picker unit are front and rear vertical shafts 7 and 8, and an endless slat belt structure 9 carrying rotary picking spindles 11 is trained around the shafts 7 and 8 in conventional manner. The rear vertical shaft 8 mounts an upper slat belt drive sprocket 12 and a corresponding lower slat belt drive sprocket, not shown; the sprockets being spaced a predetermined vertical distance from each other and secured to the shaft for rotation in unison therewith. The front vertical shaft 7 mounts a top idler 13 and a corresponding bottom idler, not shown.

The slat belt 9 is of generally conventional construction and comprises a series of spindle carrying slats 14 which are interconnected by a top chain 15 and a similar bottom chain, not shown, the slats extending vertically side by side for travel around the rear sprocket wheels 12 and front idlers 13. In conformity with established practice, the spindles 11 are arranged in vertical rows on the slats 14, and upon application of driving power to the sprocket wheel 12 in the direction of arrow 16 the spindles move along the oval path outlined in Fig. 1 and are rotated on their axes by a suitable friction drive mechanism, not shown, during their passage through the picking tunnel generally designated by the reference character 17.

Figure 3:
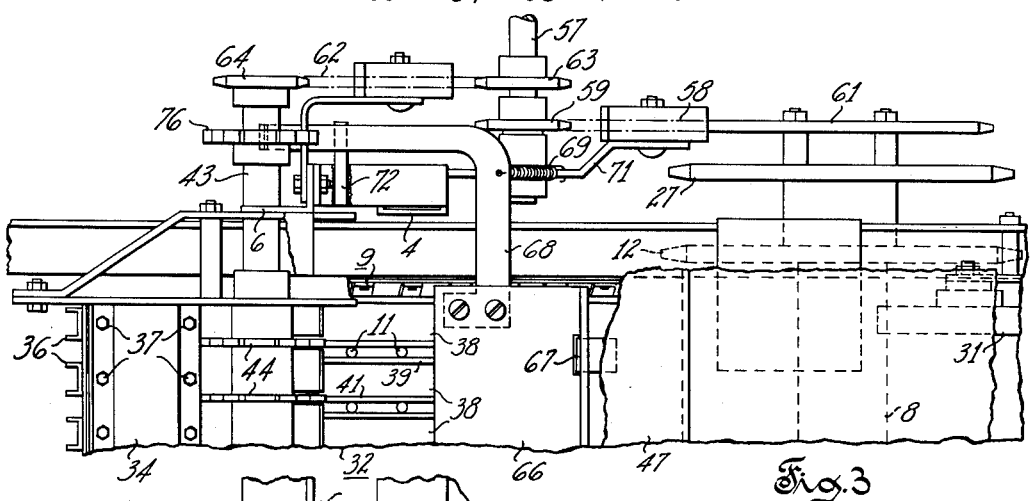
Fig. 3 is an elevational view of the part of the mechanism shown in Fig. 2.

Referring to Fig. 1, a gear casing 18 is rigidly mounted on a rearward side portion of the picker main frame, and a vertically extending sprocket shaft 19 is rotatably mounted in the casing 18 and has a sprocket wheel 21 secured to its upper end for rotation therewith. A spline shaft 22 is connected by a universal joint 23 with a horizontal shaft 24 which is journaled in the casing 18 and has a suitable driving connection, as by a pair of bevel gears, not shown, within the casing 18 with the vertical sprocket shaft 19. A chain indicated by the dotted line 26 in Fig. 1 is trained around the sprocket wheel 21 on the shaft 19 and around another sprocket wheel 27 which is secured to the upper end of the rear vertical shaft 8 above the sprocket wheel 12 as best shown in Fig. 3.

The propelling vehicle, not shown, on which the picking mechanism is mounted, as outlined hereinbefore, is equipped with a suitable power transmitting mechanism, not shown, for applying driving power from the vehicle engine to the spline shaft 22. The arrow 16 in Figs. 1 and 2 indicates the normal direction in which the rear drive shaft 8 and associated sprocket wheels 12 and 27 are driven upon application of engine power to the spline shaft 22.

A sheet metal structure 28 which forms a plant divider in front of the picking tunnel 17 is mounted on the forward part of the main frame structure, and a spindle moistening device 29 of generally conventional construction is mounted laterally of the divider 28 on a portion of the main frame bottom plate 1 which extends forwardly beyond the front idler 7.

Figure 2:
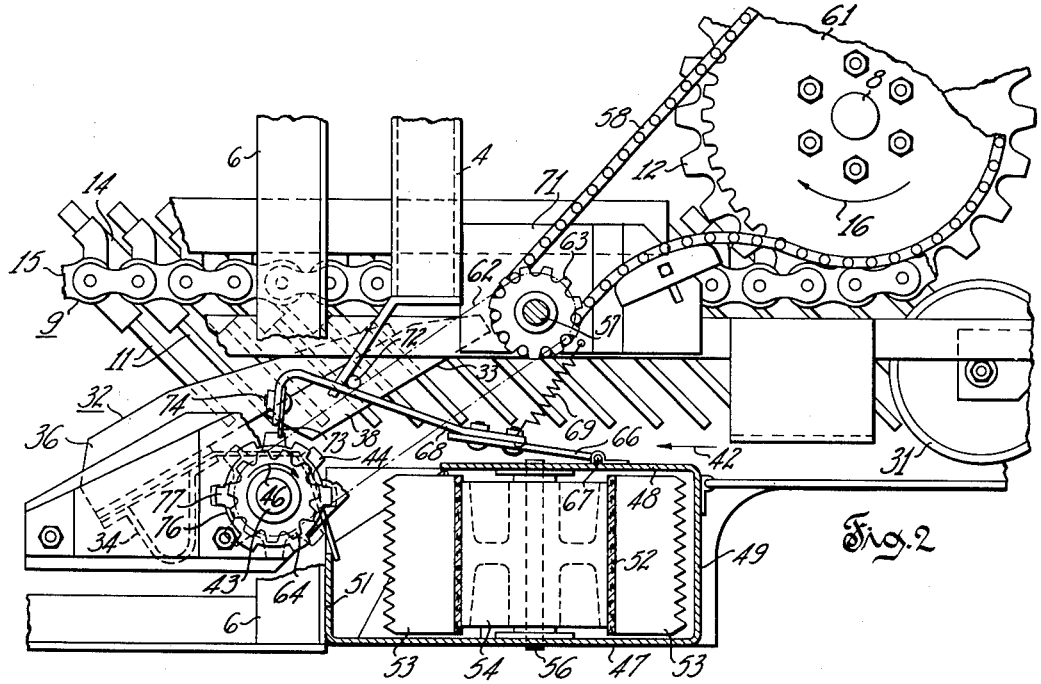
Fig. 2 is an enlarged plan view with parts broken away and shown in section of part of the mechanism shown in Fig. 1.

The individual slats 14 of the slat belt 9 are pivotally movable relative to each other within predetermined limits and provisions are made, in conformity with well known principles, to maintain the slats at generally right angles to their direction of travel through the picking tunnel 17 as shown at the left of Fig. 1, and to maintain the slats in rearwardly inclined positions, as indicated at the right of Fig. 1 and in Fig. 2 while they move forwardly from the rear drive sprockets 12 toward the front idlers 13. A slat hold back disk 31 which swings the slats into their rearwardly inclined positions is mounted on a rearward portion of the main frame structure as shown in Figs. 1 and 2. After the slats 14 have passed around the sprockets 12 in the direction of arrow 16 and have been swung into their rearwardly inclined positions they move forwardly through a vertically extending stripper assembly which is generaly indicated in Figs. 1 and 2 by the reference character 32 and the upper part of which is best shown in elevation in Fig. 3. In conformity with established principles of construction, the stripper assembly includes a hollow column 34 which is fixedly secured on the picker main frame in a vertical position, and a vertical series of channel shaped stripper mounting brackets 36 are rigidly secured to the column 34 by means of bolts 37 as best shown in Figs. 2 and 3. The stripper mounting brackets 36 extend obliquely in a rearward direction toward the slat belt structure 9, and the brackets 36 are vertically spaced from each other to provide a slotted spindle entrance side. The vertically spaced brackets provide for the passage of the picking spindles 11 through the spaces therebetween when the slat belt is driven by the sprocket wheel 12 in the direction of arrow 16. Each bracket 36 mounts a stripper shoe or bar 38 which presents an upper horizontally extending stripping edge 39 and a lower horizontally extending stripping edge 41 as best shown in Fig. 3. Suitable provisions, not shown, are made to adjust the width of the slot between adjacent stripper shoes. The stripping edges 39 and 41 of the shoes 38 are aligned in a vertical, rearwardly inclined plane at the spindle entrance side 33 of the stripper assembly, and as the rearwardly inclined spindles with bolls of cotton wrapped around them move forward in the direction of arrow 42 in Fig. 2 they pass through the slots between relatively adjacent stripper shoes 38. The stripping edges of the stripper shoes 38 and the picking spindles 11 moving forwardly through the slots of the stripper assembly are disposed in such relation to each other that final separation of the wrapped up cotton lint from the spindles will take place along the vertical edge of the spindle entrance side 33 which lies next to the column 34 and where the free ends of the spindles recede into the slots between the stripper shoes.

As shown in Figs. 2 and 3, a rotary shaft 43 is mounted on the main frame of the picker unit for rotation on a vertical axis in proximity to the ends of the stripper shoes 38 where the final separation of the cotton from the spindles 11 takes place. The shaft 43 mounts a vertical series of stripper cleaning disks 44 for rotation in unison therewith and, as shown in Fig. 3, the cleaning disks 44 are slightly offset vertically relative to the slots of the stripper assembly. The stripper cleaning disks 44 are peripherally scalloped as indicated in Fig. 2 and in operation of the machine the shaft 43 is rotated in the direction of arrow 46, Fig. 2. As the scalloped edges of the cleaning disks 44 sweep past the adjacent edges of the stripper shoes 38 they assist in removing cotton from the spindle entrance side 33 of the stripper assembly 32. Features of the stripper cleaning device including the shaft 43 and cleaning disks 44 herein disclosed but not claimed are claimed in a copending application S. N. 224,408, now Patent 2,691,265, filed May 3, 1951, by R. C. Fergason, for Stripper Cleaner for Cotton Picker.

An elevator mechanism for removing stripped cotton from the space in rear of the spindle entrance side 33 of the stripper assembly 32 is mounted on a rearward portion of the picker main frame and comprises a vertical sheet metal housing having an outer side wall 47, an inner side wall 48, a rear wall 49 and a partial front wall 51. An endless conveyor belt 52 having flights 53 is mounted within the housing 47, 48, 49 and 51 for travel about a lower pulley 54 and a similar upper pulley, not shown. A supporting shaft 56 for the lower pulley 54 is mounted at its opposite ends on the casing side walls 47 and 48 and similar provisions, not shown, are made for mounting the upper pulley at the upper end of the elevator housing. The endless conveyer belt 52 is driven by application of driving power to the upper pulley, and a suitable power transmitting mechanism for that purpose includes a sprocket shaft 57 which is rotatably mounted on the picker main frame for rotation on a vertical axis as shown in Figs. 2 and 3. A driving chain 58 for the shaft 57 is trained around a sprocket wheel 59 on the shaft 57 and around an auxiliary drive sprocket 61 which is mounted above and secured to the sprocket 27 as best shown in Fig. 3. Another driving chain 62 for transmitting power from the elevator drive shaft 57 to the stripper cleaner shaft 43 is trained around a sprocket wheel 63 on the shaft 57 and around a driven sprocket wheel 64 on the upper end of the shaft 43.

An alarm system for producing an audible signal when an undue accumulation of stripped cotton occurs at the spindle entrance side of the stripper assembly 32 is arranged in proximity to the stripper assembly and constructed as folllows: A vertical plate member 66 substantially coextensive in height with the height of the stripper assembly 32 is pivotally mounted on the inner side wall 48 of the elevator housing by means of a pair of hinges one of which is shown in Figs. 2 and 3 and designated by the reference character 67. The hinges 67 afford a vertical pivot axis for the plate 66 and a coil spring 69 is hooked at one end into an arm 68 which is secured to the plate 66, the other end of the coil spring 69 being hooked into a stationary frame member 71. An upper portion of the arm 68 extends transversely of the axis of the shaft 43 and in radially spaced relation to the latter as shown in Figs. 2 and 3. A stop pin 72 is fixedly secured in upstanding position on the main frame of the picker unit and is abutable by the upper horizontally extending portion of the arm 68 to determine a limit position of the plate 66 about the vertical pivot axis afforded by the hinges 67. In the condition of the mechanism as shown in Fig. 2, the coil spring 69 is in a state of elastic elongation and thereby operative to yieldably maintain the plate member 66 in the limit position which is determined by engagement of the horizontal portion of the arm 68 with the stop pin 72. The forward end of the arm 68 is bent to extend radially toward the stripper cleaner shaft 43, and a striker plate or vibratory element 73 is yieldably mounted on the bent forward portion of the arm 68 by means of a bolt and nut 74. A circumferentially indented or toothed wheel element 76 is nonrotatably secured to the stripper cleaner shaft 43 on a level opposite to the striker plate 73 and in the condition of the mechanism as shown in Fig. 2 the free end of the striker plate 73 is out of range of the teeth or projections 77 on the wheel 76. However, the striker plate 73 is adjusted on the arm 68 to such a position that a relatively short swinging movement of the plate 66 in anticlockwise direction as viewed in Fig. 2 about the axis of the hinges 67 will bring the free edge of the plate 73 into the path of movement of the projections 77.

In operation, cotton which is stripped from the forwardly moving spindles 11 by the stripper assembly 32 will normally be removed through the action of the stripper cleaning disks 44 and the moving conveyer flights 53 without causing an undue accumulation of cotton at the spindle entrance side 33 of the stripper assembly. However, under certain abnormal conditions, as for instance if a seed kernel or other obstruction should become lodged in one of the slots of the stripper assembly, the cleaning disk 44 for that slot may fail to effectively remove the cotton from the stripper assembly and, as a result, stripped cotton will accumulate at the spindle entrance side of the stripper assembly and such accumulation will continue until the size of the body of compacted cotton building up at the spindle entrance side of the stripper assembly becomes large enough to crowd the plate member 66 from the predetermined limit position in which it is shown in Fig. 2 toward the side wall 48 or, in other words, away from the spindle entrance side of the stripper assembly. Such movement of the plate member 66 will bring the striker plate 73 into the path of movement of the projections 77 on the wheel 76. It will be understood that the wheel element must have at least one alarm actuating eccentric projection. The striker plate 73 is yieldable, for which purpose it may be made of spring steel, for instance, and movement of the projection 77 in the direction of arrow 46 past the striker plate 73 will produce a loud rattling noise which will warn the operator of the existing clogged condition of the machine. The operator upon hearing the signal may promptly stop the machine and restore it to normal operating condition by removing the undue accumulation of the cotton at the spindle entrance side of the stripper.

Figure 4:
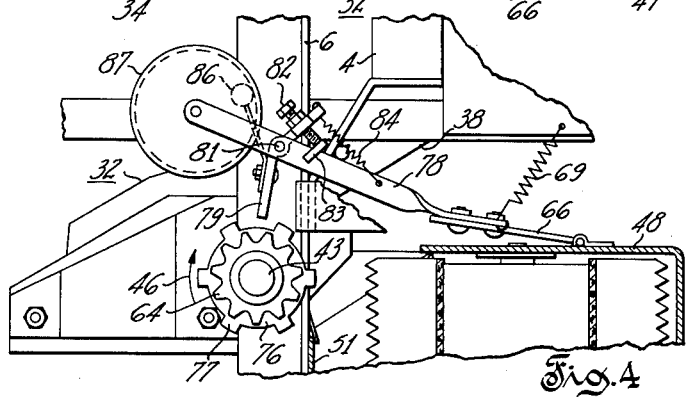
Fig. 4 is a plan view with parts broken away and shown in section of a modification of the mechanism shown in Figs. 1, 2 and 3.

The modified embodiment of the invention shown in Fig. 4 is based on substantially the same mode of operation as that described hereinbefore in connection with Figs. 1, 2 and 3. In lieu of the arm 68, an arm 78 is secured to the swingable plate member 66 of the modified mechanism shown in Fig. 4. A striker lever 79 is pivotally mounted on the arm 78 by means of a vertical pivot pin 81, and a set screw 82 is adjustably mounted on the lever 79 and is resiliently urged into engagement with a fixed abutment 83 on the arm 78 by means of a coil spring 84. Also secured to the lever 79 is a hammer 86 for sounding a bell 87 which is mounted on the arm 78.

In the condition of the mechanism as shown in Fig. 4, the arm of the lever 79 next to the wheel 76 is out of range of the teeth 77 and in this condition rotation of the shaft 43 will be ineffective to sound the alarm. However, if due to an abnormal condition the stripper cleaner 44 should fail to function properly and cotton should accumulate to an objectionable extent at the spindle entrance side of the stripper assembly 32, the plate member 66 will be crowded by the accumulating cotton toward the side wall 48 of the elevator housing. As a result, the lever 79 in Fig. 4, like the striker plate in Fig. 2, will be moved into the path of the teeth 77 and the hammer 86 will intermittently strike the bell 87. The operator will thus be warned of the existing clogged up condition of the machine.

Figure 5:
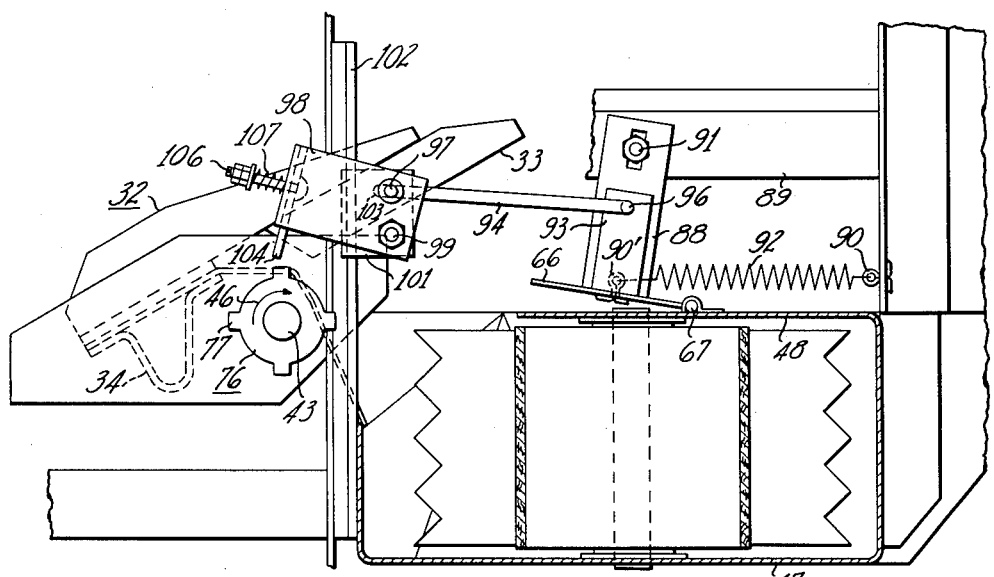
Fig. 5 is a plan view with parts broken away and shown in section of a second modification of the mechanism shown in Figs. 1, 2 and 3.
Figure 6:
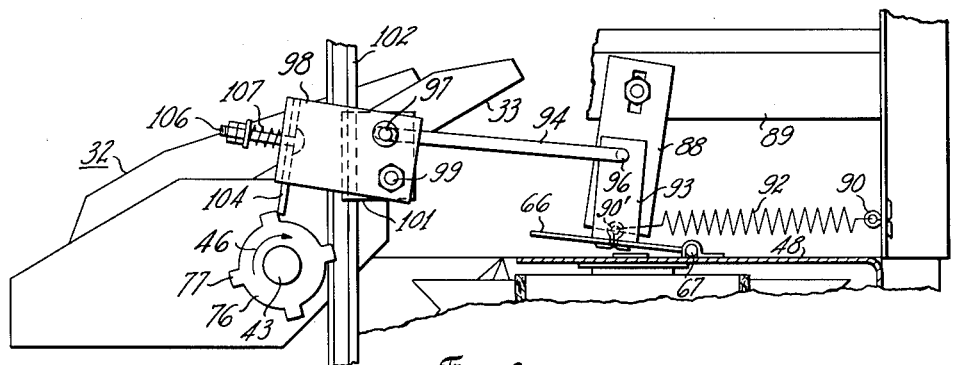
Fig. 6 is a view similar to Fig. 5 but showing the mechanism in a condition of adjustment different from that in which it is shown in Fig. 5.

In the modified embodiment of the invention as shown in Figs. 5 and 6, a horizontal stop plate 88 is adjustably secured to a frame member 89 by means of a bolt and nut 91 for determining the limit position into which the plate member 66 is urged by a coil spring 92. One end of the spring 92 is hooked into the eye of a cotter key 90 on the main frame of the picker unit, and the other end of the spring 92 is hooked into the eye of another cotter key 90' which is swingable with the plate 66 about the axis of the hinges 67. In the condition of the mechanism as shown in Fig. 5, the spring 92 is in a state of axial extension and effective to hold the plate 66 with moderate pressure against the adjacent end edge of the plate 88.

Rigidly secured to the plate member 66 is a bracket plate 93 which extends horizontally at substantially right angles to the plane of the plate member 66. A link 94 has an end pivot 96 by means of which the link 94 is operatively connected with the bracket plate 93 for actuation thereby and swinging movement relative thereto on a vertical axis. The other end of the link 94 has a vertical end pivot 97 in cooperative engagement with a rocker element or plate 98 which is mounted for horizontal back and forth movement about a pivot bolt 99. A stationary angle bracket 101 has a vertical flange rigidly secured to a frame member 102 of the picker unit. The pivot bolt 99 is mounted on a horizontal flange of the bracket 101, and the end pivot 97 of the link 94 extends downwardly into a slotted hole 103 of the horizontal flange of the angle bracket 101. A striker plate 104 is resiliently mounted on the rocker plate 98 by means of a bolt 106 and a coil spring 107, the bolt 106 extending through a hole in the striker plate 104 and through an aligned hole in a vertical flange of the rocker plate 98.

In the condition of the mechanism as shown in Fig. 5, the end of the striker plate 104 next to the wheel 76 is out of range of the teeth 77, and rotation of the shaft 43 will, therefore, be ineffective to sound the alarm.

Fig. 6 shows the mechanism in its alarm sounding condition to which it is automatically adjusted by an undue accumulation of cotton at the spindle entrance side 33 of the stripper 32. As shown in Fig. 6, the plate member 66 is crowded away from the stop plate 88 and although the angular displacement of the plate 66 from the limit position in which it is shown in Fig. 5, is relatively small, the rocked plate 98 is swung about its pivot center 99 sufficiently to bring the striker plate 104 into the path of movement of the teeth 77 on the wheel 76. It will be noted that the radial spacing of the end pivot 97 of the link 94 from the pivot bolt 99 is substantially shorter than the radial spacing of the end pivot 96 of the link 94 from the pivot axis of the hinges 67. A relatively small angular displacement of the plate 66 from its predetermined limit position in a direction away from the spindle entrance side of the stripper assembly 33 will, therefore, be effective to bring the striker plate 104 of the alarm into the path of movement of the teeth 77 on the wheel 76. The stripper cleaner shaft 43 normally rotates in the direction of arrow 46 during operation of the machine in order to actuate the stripper cleaning disks 44, and when the rocker plate 98 is moved to the position in which it is shown in Fig. 6 engagement of the teeth 77 with the striker plate 104 will alternately force the plate 104 away from the adjacent flange of the rocker plate 98 and then release it so that the plate 104 will snap back under the action of the coil spring 107. Impact of the striker plate 104 with the vertical flange of the rocker plate 98 will produce the desired warning signal.

It should be understood that it is not intended to limit the invention to the particular forms and details described hereinabove, and that the invention includes such other forms and modifications as are embraced by the scope of the appended claims.

It is claimed and desired to secure by Letters Patent:

1. In a cotton picker of the rotary spindle type, the combination of a frame structure, a spindle stripper assembly fixedly mounted on said frame structure and presenting a slotted spindle entrance side, a plate member yieldably mounted on said frame structure in a predetermined limit position at said spindle entrance side of said stripper assembly and in such relation to the latter that said plate member will be crowded from said limit position in a direction away from said stripper assembly upon undue accumulation of stripped cotton at said spindle entrance side; power transmitting means operatively mounted on said frame structure for driving an endless slat belt structure and rotary picking spindles associated therewith, and a sound alarm mechanism comprising a wheel element rotatably mounted on said frame structure and connected in driven relation with said power transmitting means, said wheel element having at least one alarm actuating eccentric projection; and a vibratory element operatively connected with said plate member for movement into cooperative engagement with said eccentric projection upon said movement of said plate member from said predetermined limit position in a direction away from said stripper assembly.

2. In a cotton picker of the rotary spindle type, the combination of a frame structure, a spindle stripper assembly fixedly mounted on said frame structure and presenting a slotted spindle entrance side, a stripper cleaner mechanism including a power driven shaft rotatably mounted on said frame structure alongside said stripper assembly, a plate member yieldably mounted on said frame structure in a predetermined limit position at said spindle entrance side of said stripper assembly and in such relation to the latter that said plate member will be crowded from said limit position in a direction away from said stripper assembly upon undue accumulation of stripped cotton at said spindle entrance side, and a sound alarm mechanism comprising a circumferentially indented wheel element connected with said power driven shaft for rotation in unison therewith, and a vibratory element operatively connected with said plate member for movement into cooperative engagement with said wheel element upon said movement of said plate member from said predetermined limit position in a direction away from said stripper assembly.

3. In a cotton picker of the rotary spindle type, the combination of a frame structure, a spindle stripper assembly fixedly mounted on said frame structure and presenting a slotted spindle entrance side, a plate member yieldably mounted on said frame structure in a predetermined limit position at said spindle entrance side of said stripper assembly and in such relation to the latter that said plate member will be crowded from said limit position in a direction away from said stripper assembly upon undue accumulation of stripped cotton at said spindle entrance side; power transmitting means operatively mounted on said frame structure for driving an endless slat belt structure and rotary picking spindles associated therewith, and a sound alarm mechanism comprising a wheel element rotatably mounted on said frame structure and connected in driven relation with said power transmitting means, said wheel element having at least one alarm actuating eccentric projection, an arm secured to said plate member and having a portion extending transversely of the axis of rotation of said wheel element and in radially spaced relation to the latter, and a striker element yieldably mounted on said arm portion in a position so as to be out of range of said eccentric projection while said plate member is in said predetermined limit position, and so as to be engageable by said projection upon said movement of said plate member from said limit position in a direction away from said stripper assembly.

4. In a cotton picker, the combination set forth in claim 3 and further comprising a bell fixedly mounted on said arm, and a hammer for sounding said bell operatively connected with said striker element.

5. In a cotton picker of the rotary spindle type, the combination of a frame structure, a spindle stripper assembly fixedly mounted on said frame structure and presenting a slotted spindle entrance side, a plate member yieldably mounted on said frame structure in a predetermined limit position at said spindle entrance side of said stripper assembly and in such relation to the latter that said plate member will be crowded from said limit position in a direction away from said stripper assembly upon undue accumulation of stripped cotton at said spindle entrance side; power transmitting means operatively mounted on said frame structure for driving an endless slat belt structure and rotary picking spindles associated therewith, and a sound alarm mechanism comprising a wheel element rotatably mounted on said frame structure and connected in driven relation with said power transmitting means, said wheel element having at least one alarm actuating eccentric projection, a rocker element pivotally mounted on said frame structure independently of said plate member and wheel element, link means operatively interposed between said plate member and rocker element, and a striker element connected with said rocker element in a position so as to be normally out of range of said eccentric projection and so as to move into the path of said eccentric projection upon movement of said rocker element in response to movement of said plate member from said predetermined position in a direction away from said stripper assembly.

6. In a cotton harvester, the combination set forth in claim 5, wherein said plate member is pivotally mounted on said frame structure, and wherein a rocker actuating link is operatively connected at one of its ends with said plate member at a predetermined radial spacing from the pivot center of the latter, the other end of said actuating link being operatively connected with said rocker at a radial spacing from the pivot center of the latter which is shorter than said predetermined radial spacing of said one end of said link from said pivot center of said plate member.

References Cited in the file of this patent

UNITED STATES PATENTS

| | | |
|---|---|---|
| 163,015 | Johnson | May 11, 1875 |
| 576,814 | Gonorovsky | Feb. 9, 1897 |
| 675,817 | Cooper | June 4, 1901 |
| 855,701 | Gierding | June 4, 1907 |
| 859,231 | Koch | July 9, 1907 |
| 1,224,843 | Bradley | May 1, 1917 |
| 1,232,549 | Hoover | July 10, 1917 |
| 2,200,303 | Rust | May 14, 1940 |
| 2,458,531 | Rust | Jan. 11, 1949 |
| 2,533,630 | Rust | Dec. 12, 1950 |
| 2,633,097 | Frew | Mar. 31, 1953 |